(12) United States Patent
Ito et al.

(10) Patent No.: US 12,274,316 B2
(45) Date of Patent: Apr. 15, 2025

(54) TEMPERATURE CONTROL DEVICE, GARMENT, AND ATTACHMENT ASSIST TOOL

(71) Applicant: Sony Thermo Technology Inc., Tokyo (JP)

(72) Inventors: Yoichi Ito, Tokyo (JP); Kenji Itoh, Tokyo (JP)

(73) Assignee: SONY THERMO TECHNOLOGY INC., Tokyo (JP)

( * ) Notice: Subject to any disclaimer, the term of this patent is extended or adjusted under 35 U.S.C. 154(b) by 698 days.

(21) Appl. No.: 17/272,543

(22) PCT Filed: Sep. 9, 2019

(86) PCT No.: PCT/JP2019/035333
§ 371 (c)(1),
(2) Date: Mar. 1, 2021

(87) PCT Pub. No.: WO2020/066564
PCT Pub. Date: Apr. 2, 2020

(65) Prior Publication Data
US 2021/0321682 A1    Oct. 21, 2021

(30) Foreign Application Priority Data

Sep. 26, 2018  (JP) .................... 2018-180159
May 16, 2019   (JP) .................... 2019-093020

(51) Int. Cl.
*A41D 13/005* (2006.01)
*A41D 13/002* (2006.01)
(Continued)

(52) U.S. Cl.
CPC ..... *A41D 13/0053* (2013.01); *A41D 13/0025* (2013.01); *A41D 27/205* (2013.01); *A41D 27/28* (2013.01); *G05D 23/1931* (2013.01)

(58) Field of Classification Search
CPC ............ A41D 13/0053; A41D 13/0058; A41D 13/0051; A41D 13/005; A41D 13/002;
(Continued)

(56) References Cited

U.S. PATENT DOCUMENTS

2004/0159109 A1    8/2004  Harvie
2024/0057697 A1*   2/2024  Young ................... A61F 5/0106

FOREIGN PATENT DOCUMENTS

CN    101246532 A    8/2008
CN    204169106 U    2/2015
(Continued)

OTHER PUBLICATIONS

English translation of Altmann et al. (DE 102011007419 A1) (Year: 2012).*

(Continued)

*Primary Examiner* — Miguel A Diaz
(74) *Attorney, Agent, or Firm* — Paratus Law Group, PLLC

(57) ABSTRACT

A temperature control device includes: a first sensor that measures at least temperature; a controller to which the temperature measured by the first sensor is inputted; a temperature changer that is electrically coupled to the controller; a heat dissipation member that is provided on one of sides of the temperature changer; and a fan that ventilates an area around the heat dissipation member.

19 Claims, 20 Drawing Sheets

(51) Int. Cl.
*A41D 27/20* (2006.01)
*A41D 27/28* (2006.01)
*G05D 23/19* (2006.01)

(58) Field of Classification Search
CPC .. A41D 13/0025; A41D 27/205; A41D 27/28; A41D 2400/10; A41D 2400/12; G05D 23/1931; G05D 23/193; G05D 23/1928; G05D 23/1927
See application file for complete search history.

(56) References Cited

FOREIGN PATENT DOCUMENTS

| CN | 204708036 U | * | 10/2015 | |
|---|---|---|---|---|
| CN | 105677012 A | | 6/2016 | |
| CN | 105934134 A | | 9/2016 | |
| CN | 106174783 A | | 12/2016 | |
| CN | 106792407 A | | 5/2017 | |
| CN | 107111334 A | | 8/2017 | |
| CN | 108552644 A | | 9/2018 | |
| DE | 10 2009 052 864 A1 | | 5/2011 | |
| DE | 102011007419 A1 | * | 10/2012 | ......... A41D 13/0051 |
| JP | 2000234201 A | * | 8/2000 | ........... A41D 13/005 |
| JP | 2000-305632 A | | 11/2000 | |
| JP | 2005-331135 A | | 12/2005 | |
| JP | 2008-025052 A | | 2/2008 | |
| JP | 2013-022217 A | | 2/2013 | |
| JP | 2013-036410 A | | 2/2013 | |
| JP | 2013-248293 A | | 12/2013 | |
| JP | 2018-031101 A | | 3/2018 | |
| KR | 20160142046 A | * | 12/2016 | ............. A41D 27/28 |

OTHER PUBLICATIONS

English translation of Hyoung (KR 20160142046 A) (Year: 2016).*
English translation of Ma et al. (CN 204708036 U) (Year: 2015).*
English translation of Namikata (JP-2000234201-A). (Year: 2000).*

* cited by examiner

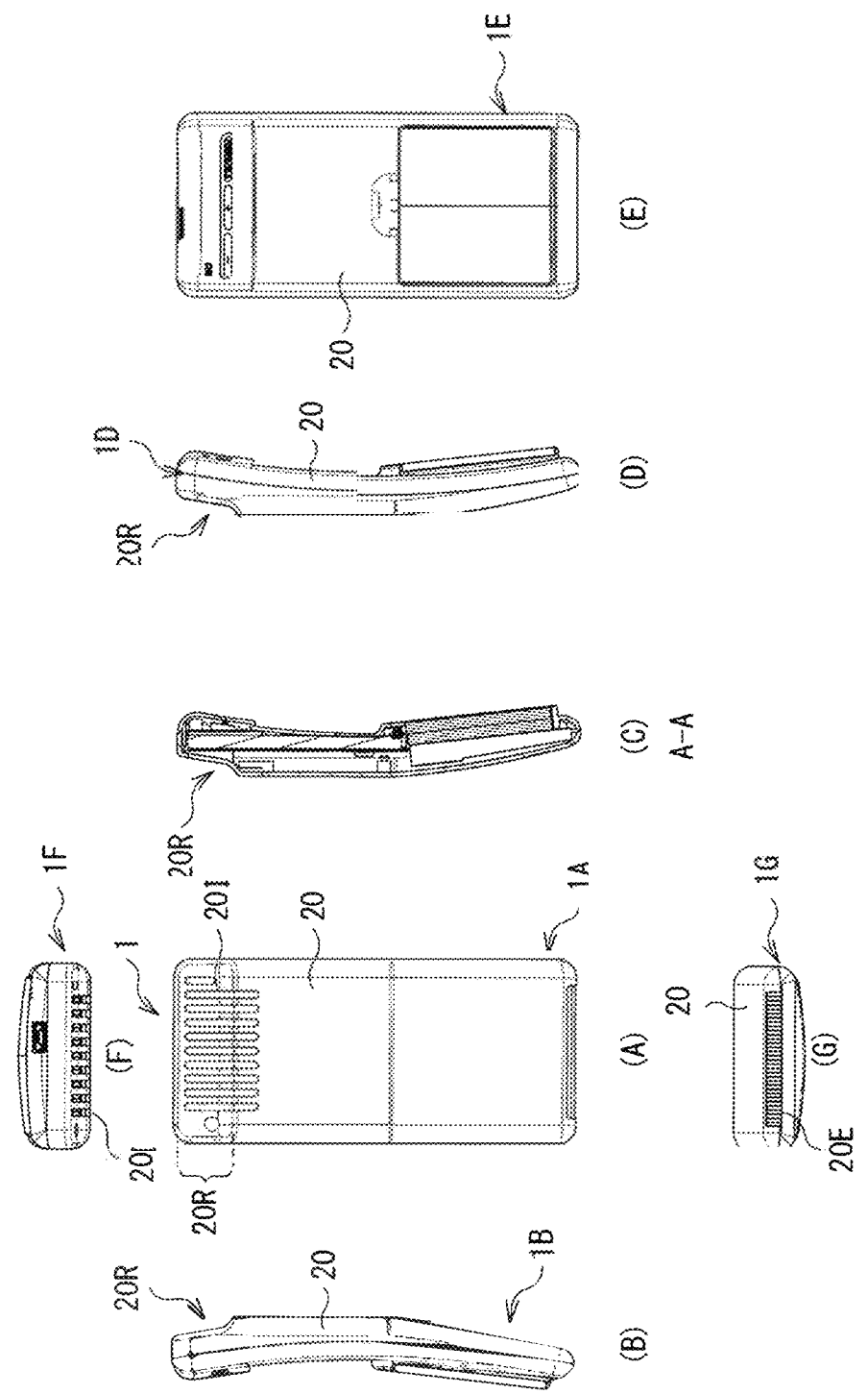
[FIG. 1]

[FIG. 2]
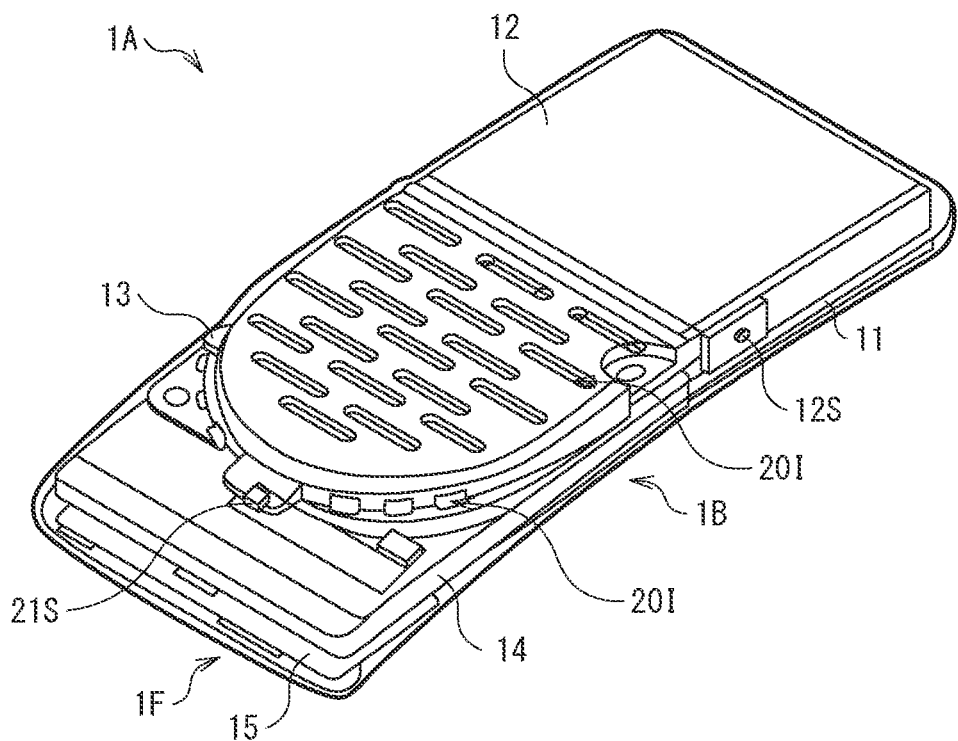

[ FIG. 3 ]
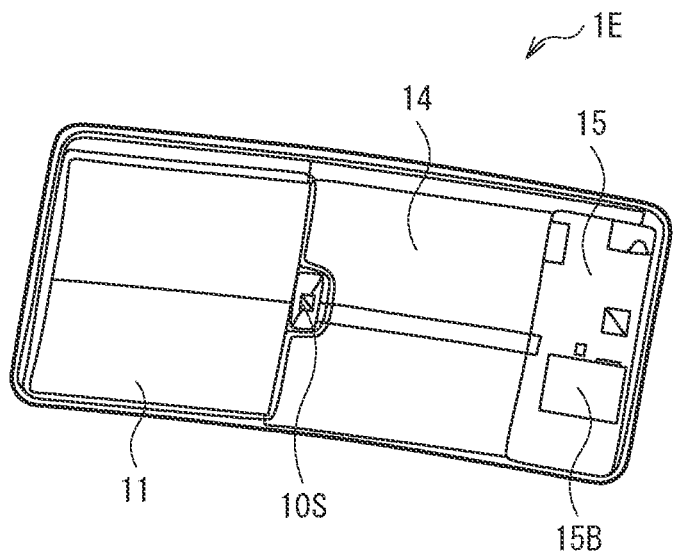
[ FIG. 4 ]
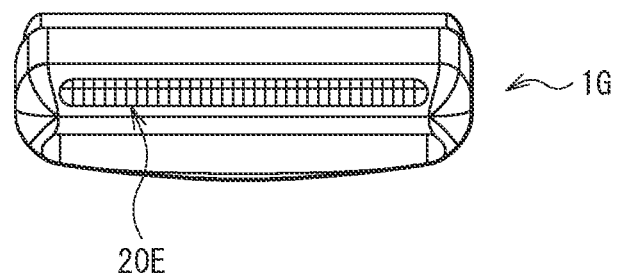

[FIG. 5A]
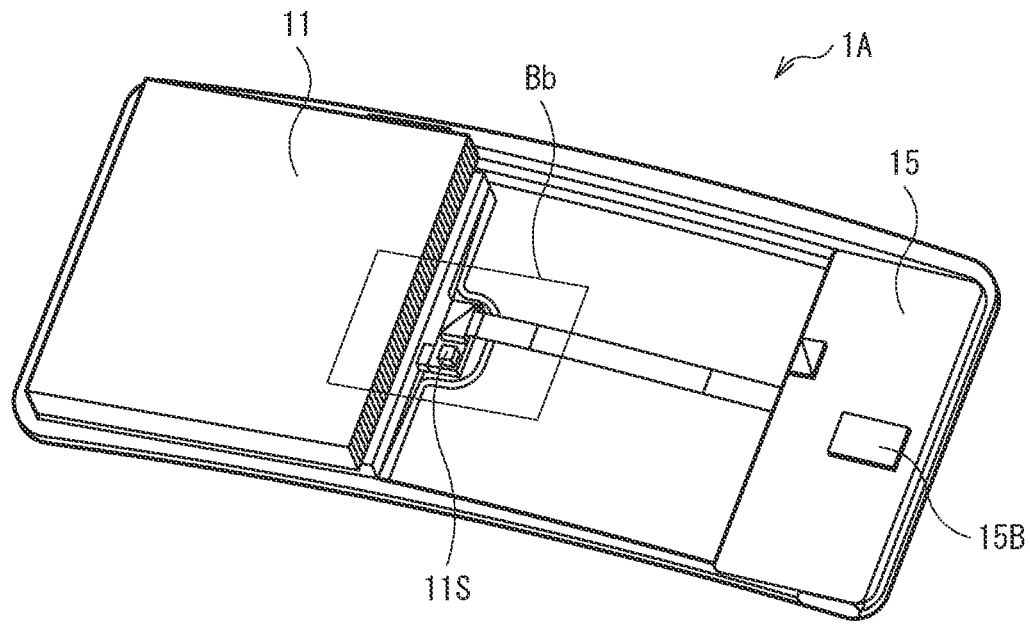
[FIG. 5B]
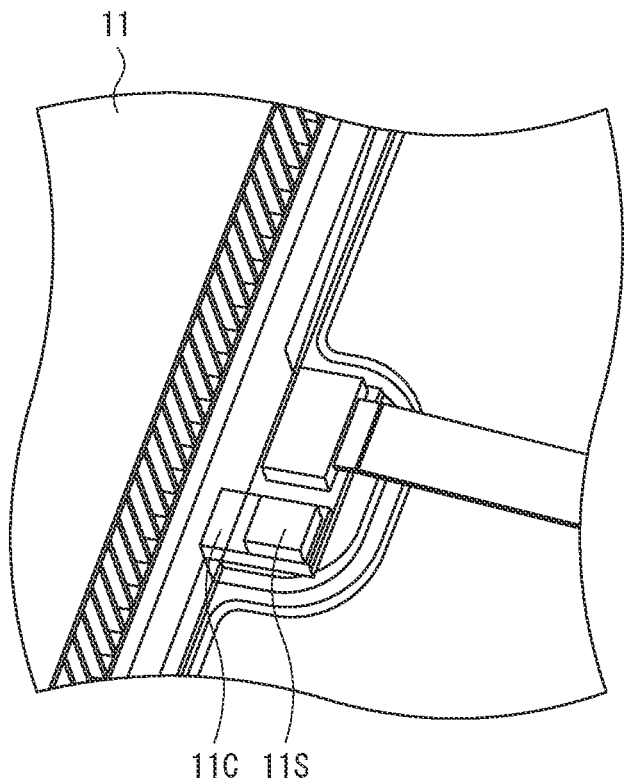

[ FIG. 6 ]
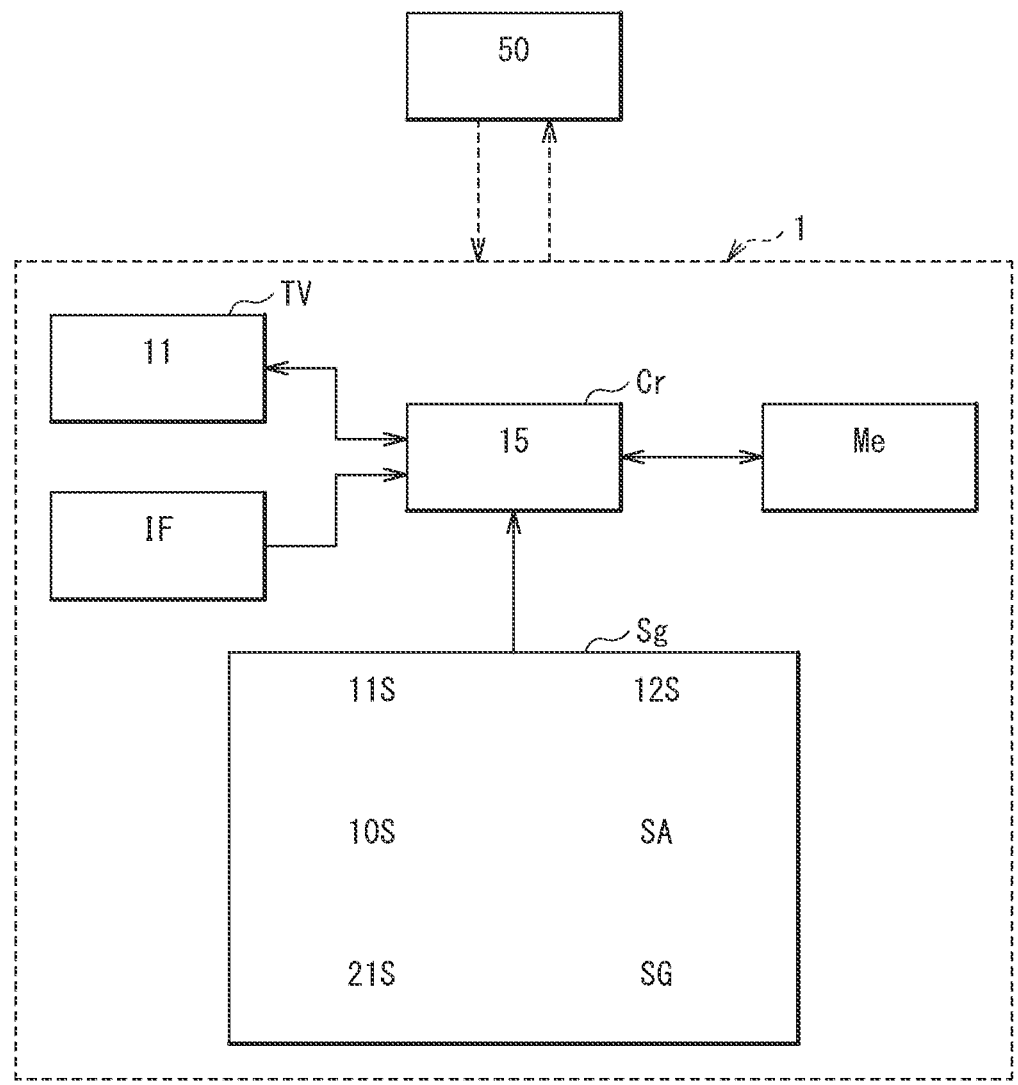

[ FIG. 7 ]
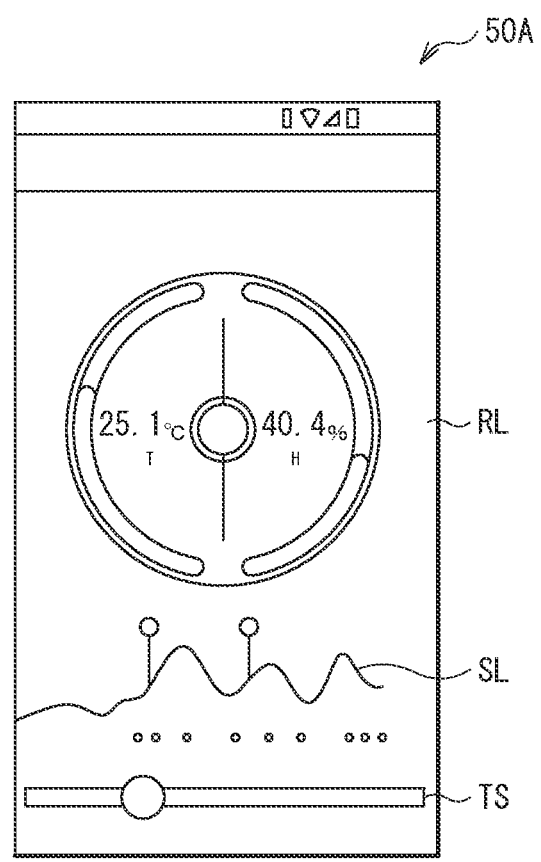

[ FIG. 8A ]
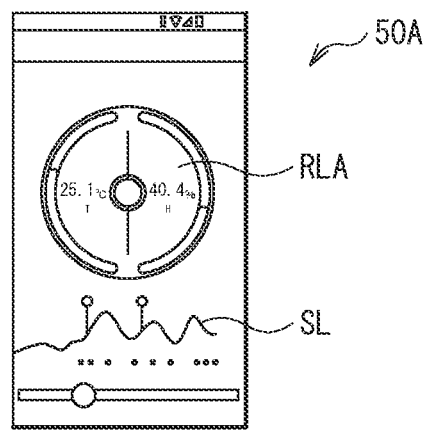
[ FIG. 8B ]
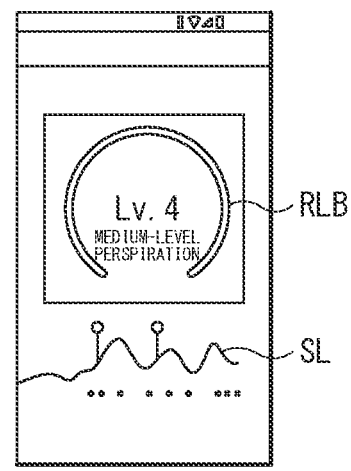
[ FIG. 8C ]
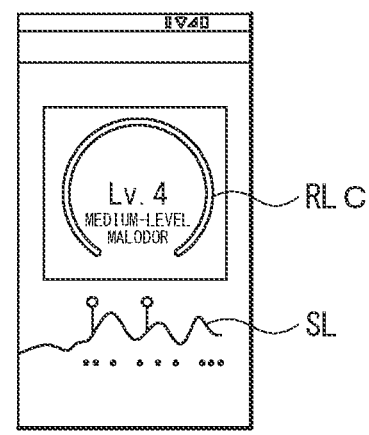

[ FIG. 9 ]
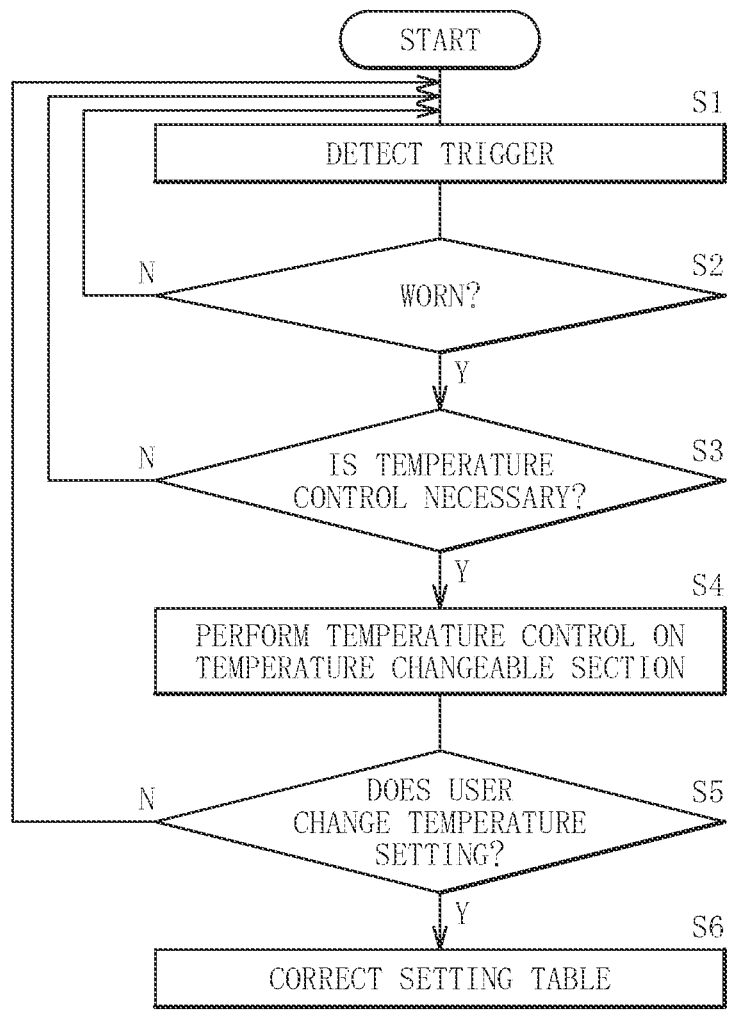

[ FIG. 10 ]
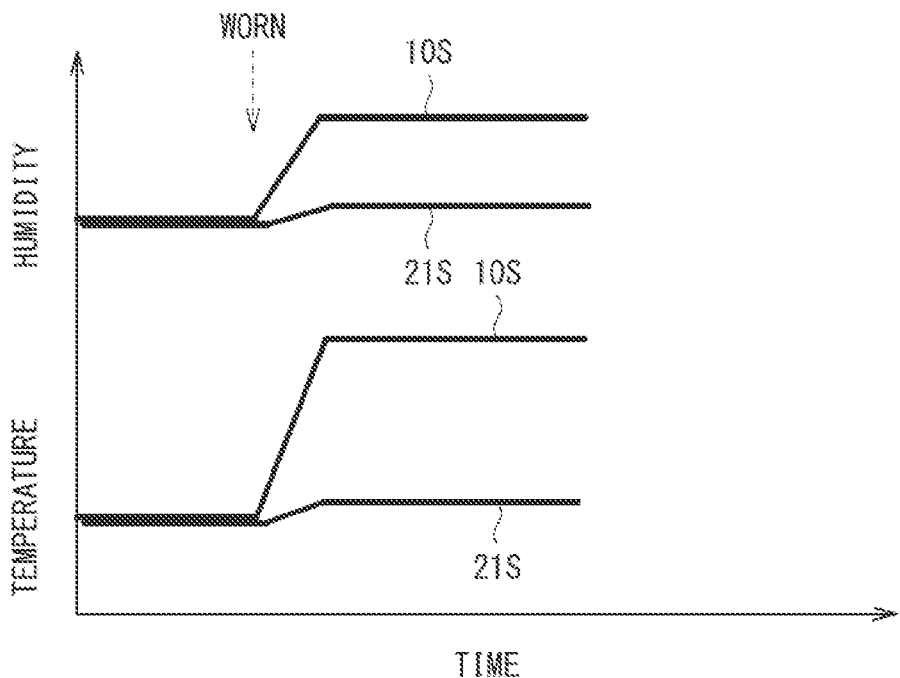
[ FIG. 11 ]
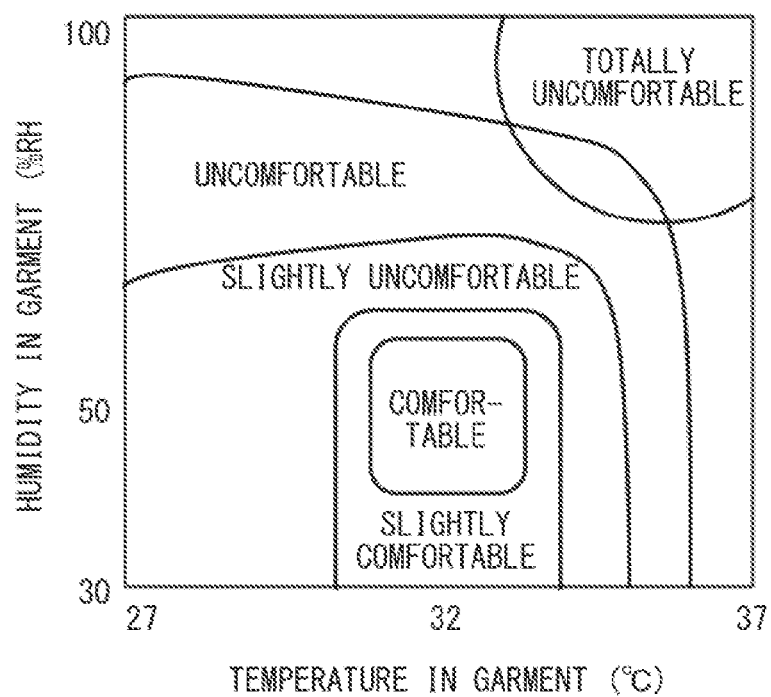

[FIG. 12]
| DISCOMFORT INDEX | UNBEARABLY HOT |
|---|---|
| 55 OR LOWER | COLD |
| 55 TO 60 | CHILLY |
| 60 TO 65 | NEUTRAL |
| 65 TO 70 | COMFORTABLE |
| 70 TO 75 | NOT HOT |
| 75 TO 80 | SLIGHTLY HOT |
| 80 TO 85 | HOT AND SWEATY |
| 85 OR HIGHER | UNBEARABLY HOT |
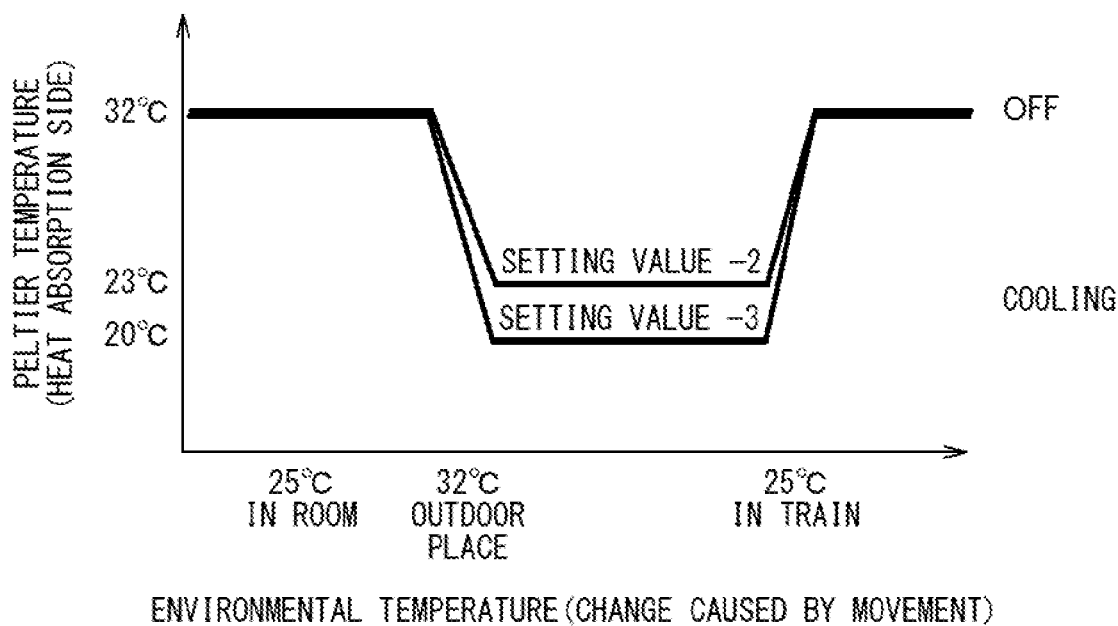
[FIG. 13]

[ FIG. 14 ]
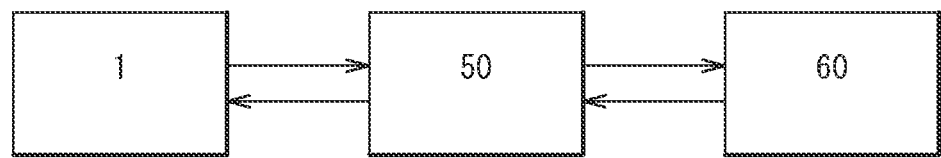
[ FIG. 15A ]
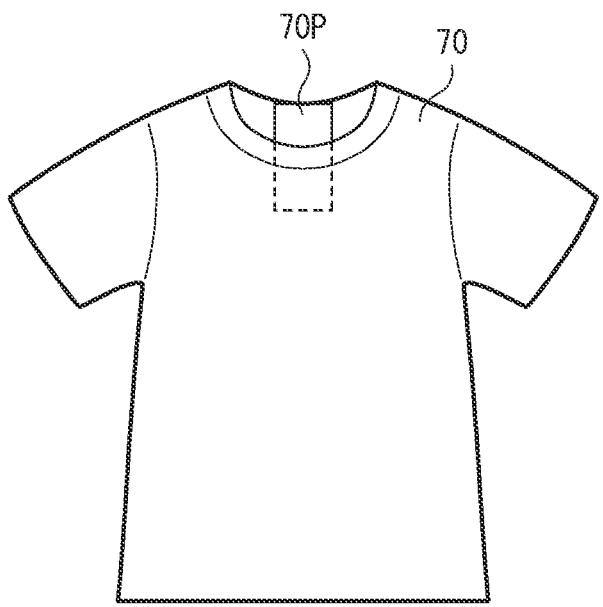
[ FIG. 15B ]
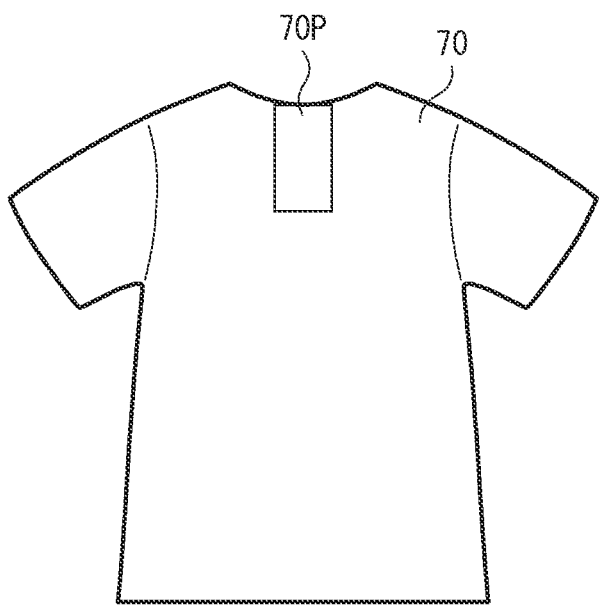

[ FIG. 16 ]
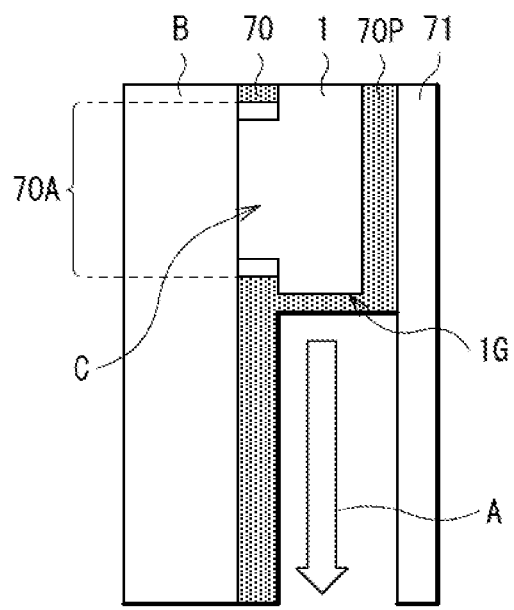
[ FIG. 17 ]
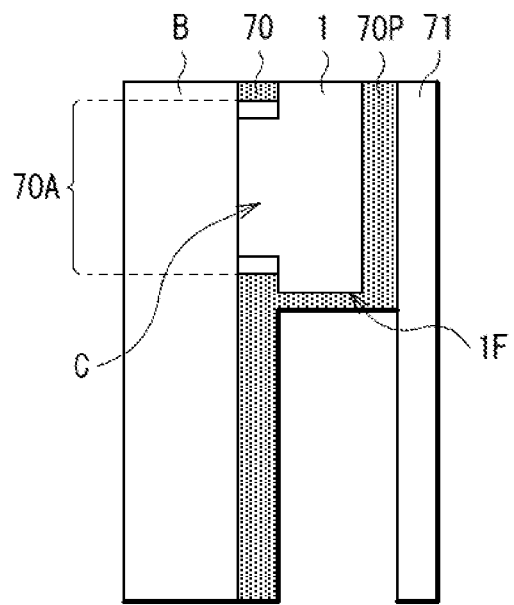

[ FIG. 18A ]
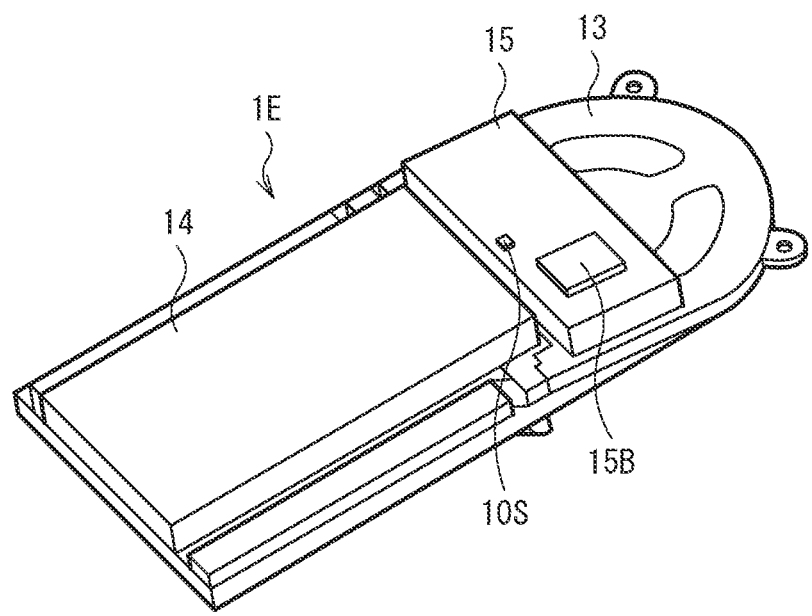
[ FIG. 18B ]
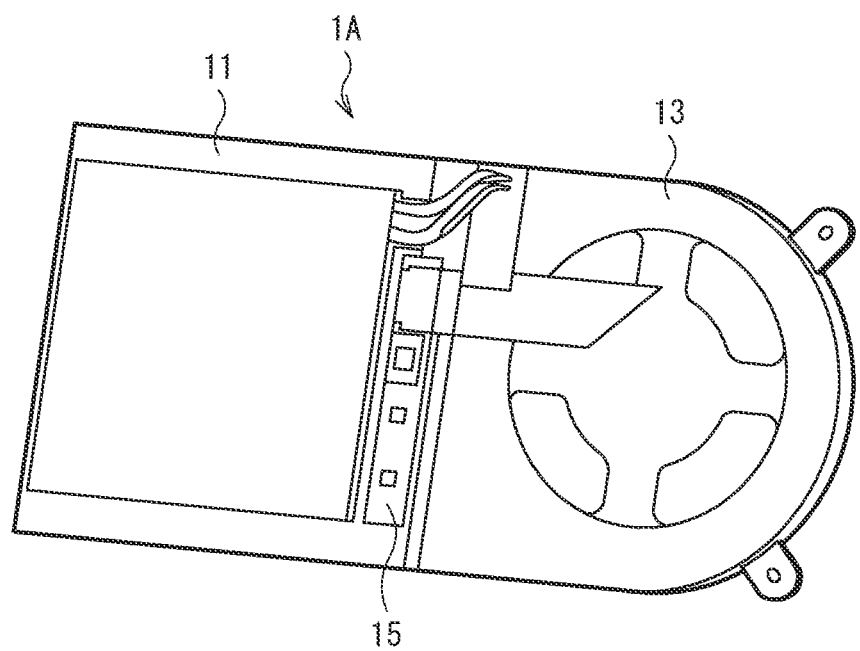

[ FIG. 19A ]
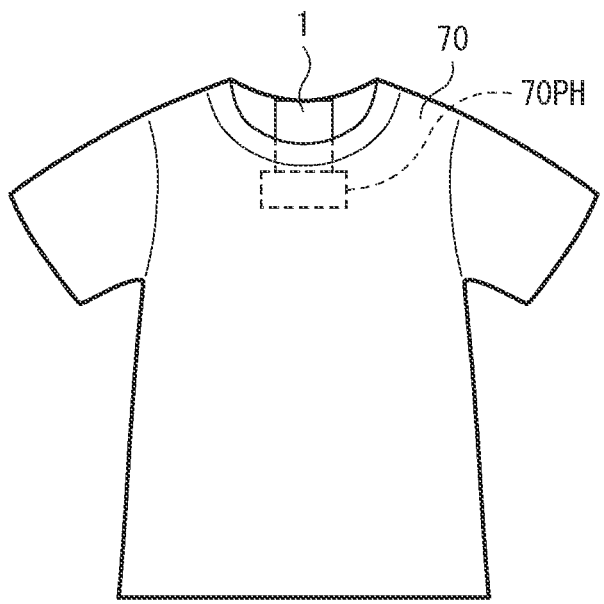
[ FIG. 19B ]
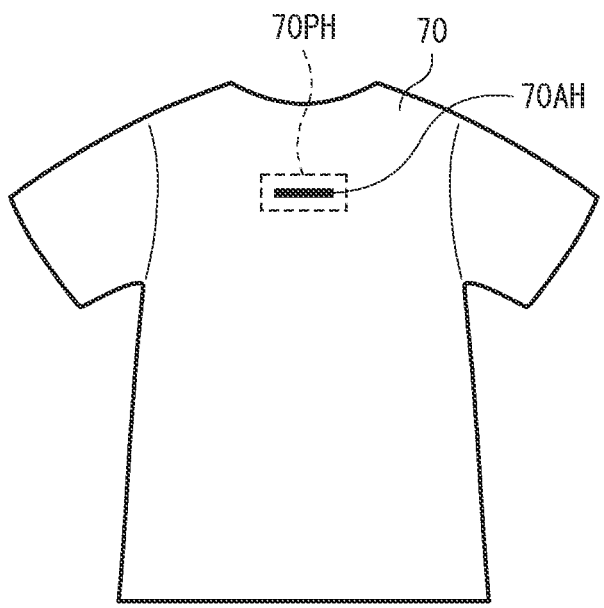

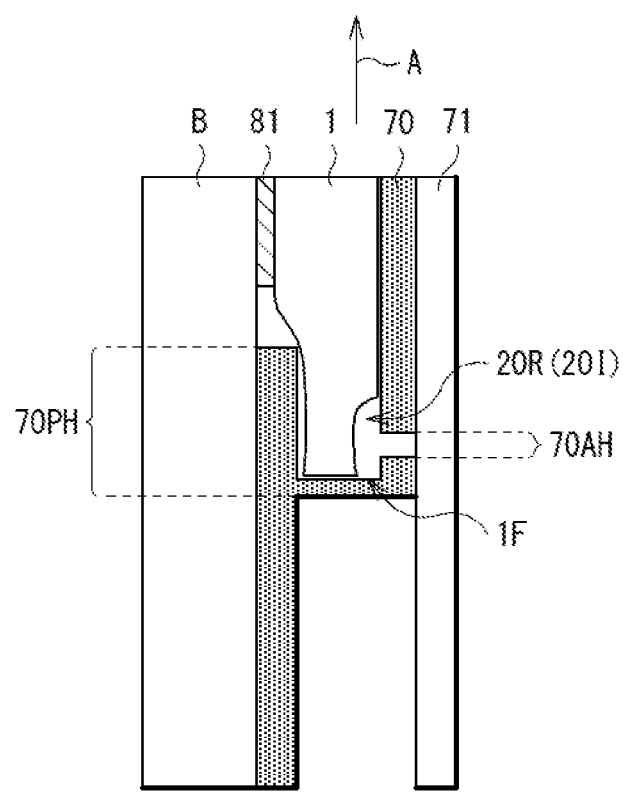
[FIG. 20]

[ FIG. 21 ]
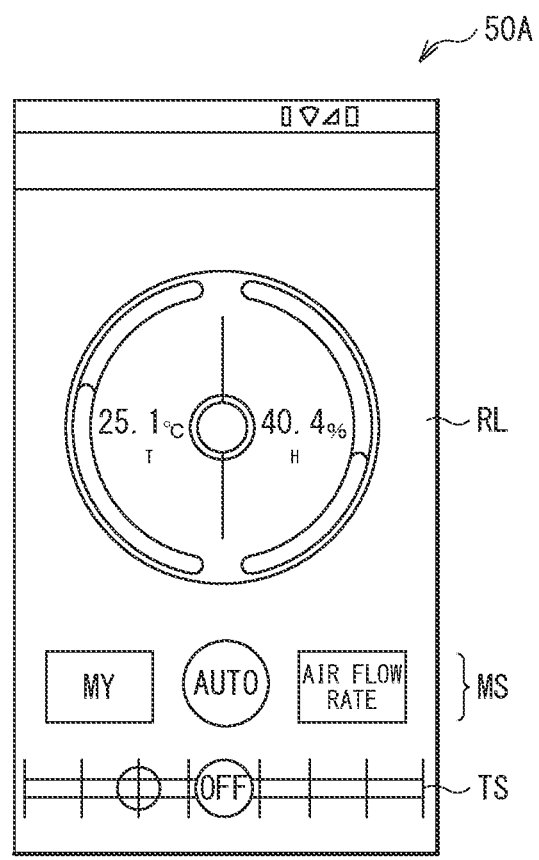

[FIG. 22]
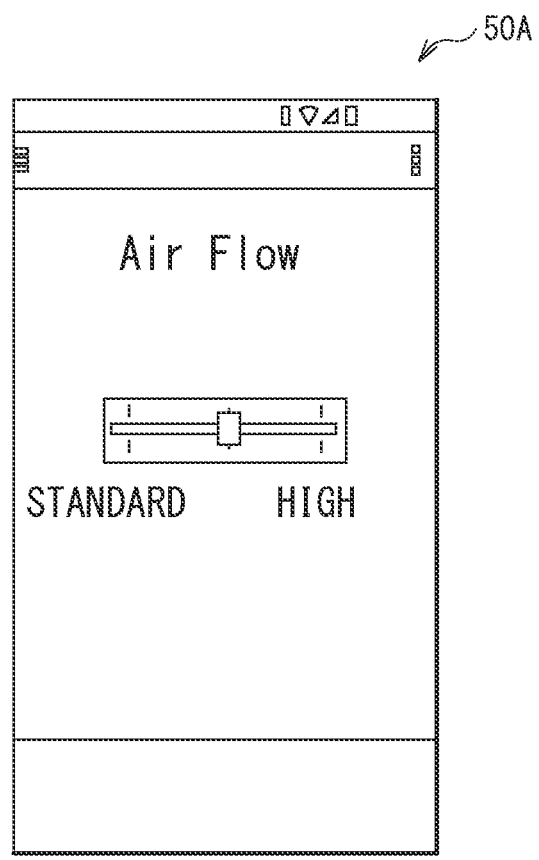

[ FIG. 23 ]
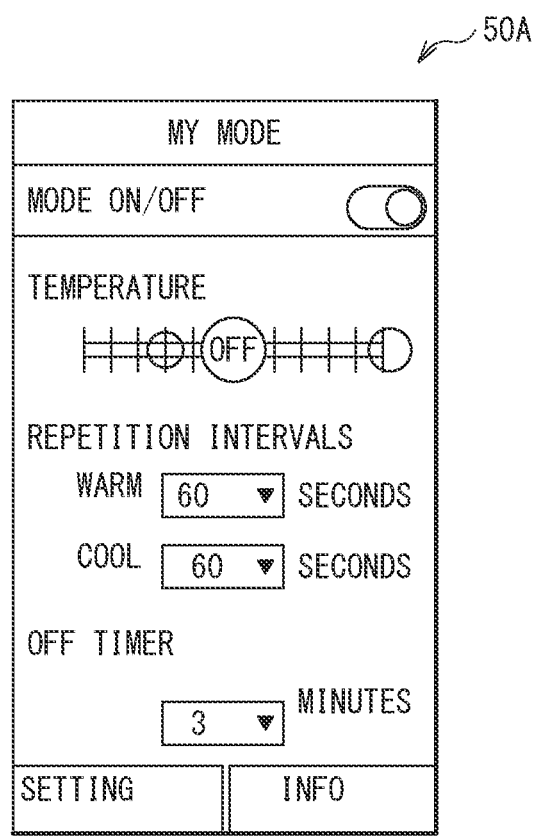

[ FIG. 24A ]
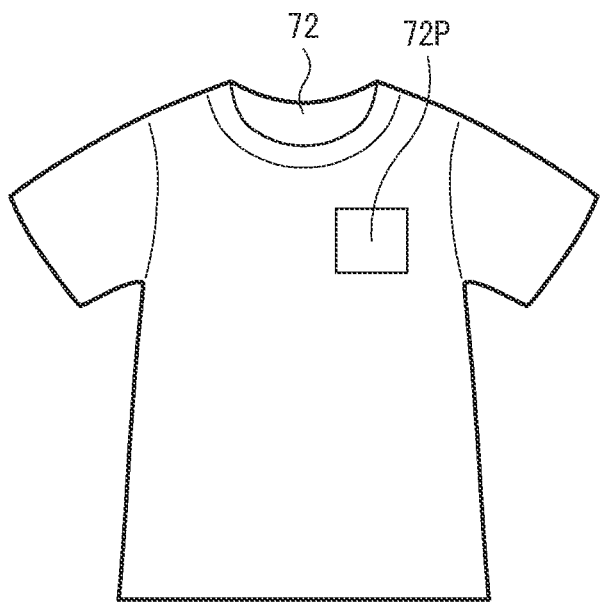
[ FIG. 24B ]
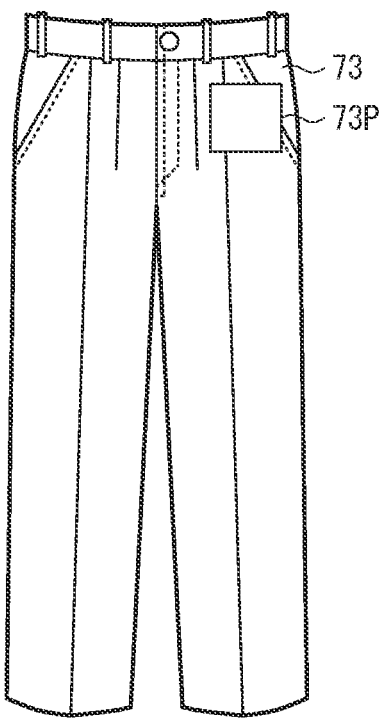

[ FIG. 25 ]
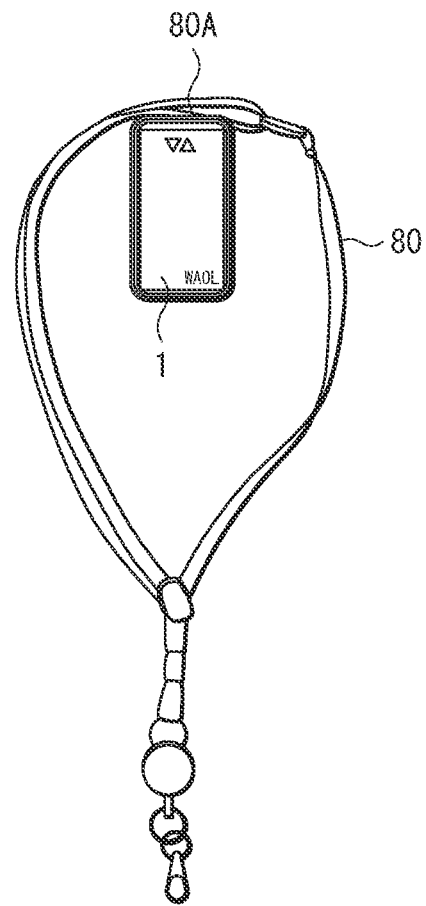

TEMPERATURE CONTROL DEVICE, GARMENT, AND ATTACHMENT ASSIST TOOL

CROSS REFERENCE TO PRIOR APPLICATION

This application is a National Stage Patent Application of PCT International Patent Application No. PCT/JP2019/035333 (filed on Sep. 9, 2019) under 35 U.S.C. § 371, which claims priority to Japanese Patent Application Nos. 2018-180159 (filed on Sep. 26, 2018) and 2019-093020 (filed on May 16, 2019) which are all hereby incorporated by reference in their entirety.

TECHNICAL FIELD

The present technology relates to a wearable (Wearable) temperature control device, a garment provided with a pocket in which this temperature control device is put, and an attachment assist tool including an attachment section for this temperature control device.

BACKGROUND ART

Global warming, heat island phenomena, and the like have caused temperature control devices each having a cooling function to be under development (see, for example, PTL 1). Each of these temperature control devices is, for example, attached to a garment or the like.

CITATION LIST

Patent Literature

PTL 1: Japanese Unexamined Patent Application Publication No. 2018-31101

SUMMARY OF THE INVENTION

It is desired that such a wearable temperature control device make a user feel more comfortable.

It is thus desirable to provide a temperature control device that allows a user to feel more comfortable, a garment provided with a pocket in which this temperature control device is put, and an attachment assist tool including an attachment section for this temperature control device.

A temperature control device according to an embodiment of the present technology includes: a first sensor that measures at least temperature; a controller to which the temperature measured by the first sensor is inputted; a temperature changer that is electrically coupled to the controller; a heat dissipation member that is provided on one of sides of the temperature changer; and a fan that ventilates an area around the heat dissipation member.

A garment according to an embodiment of the present technology is provided with a pocket in which the above-described temperature control device according to the embodiment of the present technology is put.

An attachment assist tool according to an embodiment of the present technology includes an attachment section for the above-described temperature control device according to the embodiment of the present technology.

The temperature control device, the garment, and the attachment assist tool according to the respective embodiments of the present technology each cause the controller to receive temperature measured by the first sensor (or the sensor). Temperature control is thus performed on the temperature changer in accordance with the temperature measured by the first sensor.

BRIEF DESCRIPTION OF DRAWING (A) of FIG. 1 is a front view of an example of appearance of a temperature control device according to an embodiment of the present technology, (B) is a left side view of the temperature control device illustrated in (A), (C) is a right side cross-sectional view of the temperature control device illustrated in (A), (D) is a right side view of the temperature control device illustrated in (A), (E) is a back view of the temperature control device illustrated in (A), (F) is a planar view of the temperature control device illustrated in (A), and (G) is a bottom view of the temperature control device illustrated in (A).

FIG. 2 is a schematic perspective view of an example of a front-side configuration of the temperature control device illustrated in FIG. 1 in a housing.

FIG. 3 is a diagram schematically illustrating an example of a back-side configuration of the temperature control device illustrated in FIG. 2.

FIG. 4 is a diagram schematically illustrating an example of a bottom-side configuration of the temperature control device illustrated in FIG. 2.

FIG. 5A is a diagram schematically illustrating a configuration in which a fan and the like illustrated in FIG. 2 are detached.

FIG. 5B is an enlarged view of a portion illustrated in FIG. 5A.

FIG. 6 is a block diagram illustrating an example of a configuration of the temperature control device illustrated in FIG. 2 or the like.

FIG. 7 is a diagram illustrating an example of a configuration of a display surface of a wearable device illustrated in FIG. 6.

FIG. 8A is a diagram illustrating a specific example (1) of the configuration of the display surface illustrated in FIG. 7.

FIG. 8B is a diagram illustrating a specific example (2) of the configuration of the display surface illustrated in FIG. 7.

FIG. 8C is a diagram illustrating a specific example (3) of the configuration of the display surface illustrated in FIG. 7.

FIG. 9 is a flowchart illustrating an example of a method of temperature control by a controller illustrated in FIG. 6.

FIG. 10 is a diagram for describing an example of step S2 illustrated in FIG. 9.

FIG. 11 is a diagram for describing an example (1) of step S3 illustrated in FIG. 9.

FIG. 12 is a diagram for describing an example (2) of step S3 illustrated in FIG. 9.

FIG. 13 is a diagram for describing an example of step S4 illustrated in FIG. 9.

FIG. 14 is a block diagram illustrating another example of a communication state of the temperature control device illustrated in FIG. 6.

FIG. 15A is a diagram illustrating an example of a pocket in which it is possible to put the temperature control device illustrated in FIG. 2 or the like.

FIG. 15B is a diagram illustrating another example (1) of the pocket illustrated in FIG. 15A.

FIG. 16 is a diagram for describing an operation of the temperature control device illustrated in FIG. 2 or the like.

FIG. 17 is another diagram for describing an operation of the temperature control device illustrated in FIG. 16.

FIG. 18A is a diagram illustrating a back-side configuration of a temperature control device 1 according to a modification example 1.

FIG. 18B is a diagram illustrating a front-side configuration of the temperature control device 1 illustrated in FIG. 18A.

FIG. 19A is a diagram illustrating a chest-side configuration of an undershirt according to a modification example 2.

FIG. 19B is a diagram illustrating a back-side configuration of the undershirt illustrated in FIG. 19A.

FIG. 20 is a diagram for describing how to use the undershirt illustrated in FIGS. 19A and 19B.

FIG. 21 is a diagram illustrating a configuration of a display surface according to a modification example 3.

FIG. 22 is a diagram illustrating an example of a configuration of the display surface after an air flow rate button illustrated in FIG. 21 is selected.

FIG. 23 is a diagram illustrating an example of a configuration of the display surface after a MY button illustrated in FIG. 21 is selected.

FIG. 24A is a diagram illustrating another example (2) of the pocket illustrated in FIG. 15A.

FIG. 24B is a diagram illustrating another example (3) of the pocket illustrated in FIG. 15A.

FIG. 25 is a diagram illustrating an example of a configuration of an attachment assist tool including an attachment section for the temperature control device illustrated in FIG. 2 or the like.

MODES FOR CARRYING OUT THE INVENTION

The following describes an embodiment of the present technology in detail with reference to the drawings. It is to be noted that description is given in the following order.
1. Embodiment (Temperature Control Device Including Sensor)
2. Modification Example 1 (Example of Layout of Respective Sections)
3. Modification Example 2 (Example of Undershirt)
4. Modification Example 3 (Example of Display Surface)
5. Other Modification Examples Embodiment (Appearance of Temperature Control Device 1)

(A) to (G) of FIG. 1 each illustrate an example of the appearance of a temperature control device (temperature control device 1) according to an embodiment of the present technology. This temperature control device 1 is substantially as large as a card case, for example. It is possible to put the temperature control device 1 in a pocket (e.g., pocket 70P in FIG. 15A described below) or the like of a garment. In other words, the temperature control device 1 is a temperature control device that allows a user to wear and carry (wearable) the temperature control device.

(A) of FIG. 1 illustrates a configuration of a front 1A, (B) of FIG. 1 illustrates a configuration of a left side 1B, (D) of FIG. 1 illustrates a configuration of a right side 1D, (E) of FIG. 1 illustrates a configuration of a back 1E, (F) of FIG. 1 illustrates a configuration of a flat face 1F, and (G) of FIG. 1 illustrates a configuration of a bottom 1G. (C) of FIG. 1 illustrates a cross-sectional configuration of the right side 1D. The temperature control device 1 includes a housing 20 that covers a Peltier element (Peltier element 11 in FIG. 2 described below) and the like described below. The housing 20 includes, for example, silicon, a resin material, or the like. Examples of the resin material include an ABS resin (Acrylonitrile Butadiene Styrene copolymerized synthetic resin), a PC (Poly Carbonate) resin, and the like.

The front 1A and the back 1E of the temperature control device 1 each have a rectangular shape ((A) of FIG. 1 and (E) of FIG. 1). The sides (left side 1B in (B) of FIG. 1 and right side 1D in (D) of FIG. 1) of the temperature control device 1 corresponding to the long sides of this rectangular shape are gently curved. This curved shape extends, for example, along the curved shape of the body of a human who is a user especially near the back and the neck. This appropriately brings the temperature control device 1 into contact with the user on a portion on which the user wears the temperature control device 1, making it possible to effectively cool or warm the user on the portion on which the user wears the temperature control device 1.

(Configuration of Each Section of Temperature Control Device 1)

Each of FIGS. 2 to 4 illustrates a configuration of the temperature control device 1 in which the housing 20 is detached. FIG. 2 is a perspective view of a front-1A-side configuration of the temperature control device 1. FIG. 3 illustrates a back-1E-side planar configuration of the temperature control device 1. FIG. 4 illustrates a planar configuration of the bottom 1G of the temperature control device 1. The temperature control device 1 includes, for example, the Peltier element 11 (temperature changer), a heat dissipation member 12, a heat dissipation member sensor 12S, a fan 13, a battery 14, a circuit board 15, an environment sensor 21S (second sensor), and a body surface sensor 10S (first sensor) inside the housing 20. It is to be noted that the appearance of the temperature control device 1 illustrated in FIG. 1 is slightly different from the appearance of the temperature control device 1 illustrated in each of FIGS. 2 to 4, but the temperature control device 1 may have any appearance or other appearance.

Flowing currents cause the Peltier element 11 to perform temperature control (FIGS. 2 and 3). For example, one of the principal surface sides of the Peltier element 11 is disposed on the front 1A side of the temperature control device 1 and the other principal surface side of the Peltier element 11 is disposed on the back 1E side. For example, in a case where the temperature control device 1 performs a cooling operation, one of the principal surface sides of the Peltier element 11 serves as a heat dissipation side and the other principal surface side serves as a heat absorption side. The Peltier element 11 is protected, for example, by silicon. The temperature of the Peltier element 11 is adjustable, for example, between about −20° C. and about 200° C. The Peltier element 11 is electrically coupled to the circuit board 15. Temperature control is performed on the Peltier element 11 in accordance with a signal from the circuit board 15.

FIG. 5A illustrates a configuration of the front 1A in which the fan 13 is detached and FIG. 5B is an enlarged view of a configuration of a portion (portion Bb) of the configuration illustrated in FIG. 5A. The Peltier element 11 is provided with a Peltier element sensor 11S (third sensor) near a side and this Peltier element sensor 11S and the Peltier element 11 are coupled by a heat conductive member 11C. The Peltier element sensor 11S measures, for example, the temperature of the Peltier element 11 on the heat absorption side. A signal corresponding to this measured temperature is inputted to the circuit board 15. The heat conductive member 11C includes, for example, silicon, acryl, graphite, copper foil, or the like.

The heat dissipation member 12 dissipates the heat of one of the Peltier elements 11. The heat dissipation member 12 is disposed on the heat dissipation side of the Peltier element 11 (FIG. 2). For example, the Peltier element 11 is covered with the heat dissipation member 12 on the front 1A side. The heat dissipation member 12 is a plate member having, for example, a quadrangular planar shape. The heat dissipation member 12 includes a heat dissipation fin of aluminum (Al), copper (Cu), or the like.

For example, the heat dissipation member sensor 12S is attached to the heat dissipation member 12 on the left side 1B side (FIG. 2). The heat dissipation member sensor 12S measures, for example, the temperature of the heat dissipation member 12. A signal corresponding to this measured temperature is inputted to the circuit board 15.

The fan 13 is disposed near the heat dissipation member 12 (FIG. 2). This fan 13 ventilates the area around the heat dissipation member 12. The fan 13 is disposed, for example, at a position adjacent to the Peltier element 11 and the heat dissipation member 12 in the long-side direction in the temperature control device 1 having a rectangular planar shape. The fan 13 is disposed, for example, substantially in parallel with the front 1A of the temperature control device 1. This fan 13 is for cooling the heat dissipation member 12. It is preferable that the fan 13 have, for example, a thin shape. The use of the fan 13 having a thin shape allows the temperature control device 1 to be decreased in thickness.

The housing 20 is provided with a plurality of inlet ports 20I on the front 1A side of the fan 13 (FIGS. 1 and 2). The fan 13 takes in outside air from these inlet ports 20I and sends the air to the heat dissipation member 12. For example, the housing 20 is provided with a recessed section 20R on the front 1A side (FIG. 1). The recessed section 20R is provided, for example, to one of the short sides. This recessed section 20R is provided with the inlet ports 20I. For example, a portion (portion opposite to the heat dissipation member 12) of the housing 20 adjacent to the fan 13 is disposed closer to the housing 20 on the back 1E side of the fan 13 than the front 1A side. There is a step therebetween. It is preferable that this step be also provided with the inlet ports 20I. This makes it possible to take in air from the inlet ports 20I on the step even in a case where the inlet ports 20I provided to the housing 20 on the front 1A side of the fan 13 come into close contact with a garment or the like and it is not possible to take in sufficient air.

The housing 20 is provided with an exhaust port (exhaust port 20E) on the bottom 1G (FIG. 4). The wind sent from the fan 13 to cool the heat dissipation member 12 is blown from this exhaust port 20E.

The environment sensor 21S is disposed, for example, near the inlet ports 20I. A portion of the environment sensor 21S is exposed from the housing 20 (FIG. 2). The portion of the environment sensor 21S exposed from the housing 20 is covered with a waterproof sheet (not illustrated). This waterproof sheet transmits air. The environment sensor 21S is for measuring the temperature and the humidity of the environment in which the temperature control device 1 is disposed. Signals corresponding to these measured temperature and humidity are inputted to the circuit board 15. In a case where the temperature control device 1 is put, for example, in a pocket (pocket 70P in FIGS. 15A and 15B described below) of an undershirt as described below, the environment sensor 21S measures the temperature and the humidity in the garment (between the body surface of a user and the garment). It is sufficient if the environment sensor 21S is able to measure at least the temperature in the environment in which the temperature control device 1 is disposed.

The fan 13 is provided, for example, with the battery 14 on the back 1E side (FIGS. 2 and 3). This battery 14 is for supplying the Peltier element 11, the fan 13, the circuit board 15, and the like with power supply voltages. The battery 14 is electrically coupled to the Peltier element 11, the fan 13, the circuit board 15, and the like. The battery 14 has, for example, a rectangular planar shape.

The body surface sensor 10S is disposed, for example, on the back 1E side of the battery 14 (FIG. 3). This body surface sensor 10S is for measuring the temperature and the humidity near the body surface of a user. Signals corresponding to these measured temperature and humidity are inputted to the circuit board 15. The body surface sensor 10S may be covered with a waterproof sheet (not illustrated). The body surface sensor 10S is disposed, for example, at a position at which the body surface sensor 10S does not overlap with the circuit board 15. It is sufficient if the body surface sensor 10S is able to measure at least the temperature of the body surface of a user.

The circuit board 15 electrically coupled to the battery 14 is disposed, for example, further closer to the back 1E side than the battery 14 (FIGS. 2 and 3). This circuit board 15 sends driving signals to the Peltier element 11 and the fan 13 in accordance with signals inputted from a sensor group including the heat dissipation member sensor 12S, the environment sensor 21S, the body surface sensor 10S, and the like. The circuit board 15 is shaped to be, for example, rectangular and smaller than the battery 14. The circuit board 15 is disposed overlapping with the battery 14.

The circuit board 15 is mounted, for example, with a wireless communication section 15B (FIG. 3). The wireless communication section 15B is compliant, for example, with BLE (Bluetooth Low Energy). The circuit board 15 mounted with the wireless communication section 15B allows wireless communication to be performed between the temperature control device 1 and a wearable device (wearable device 50 in FIG. 6 described below) different from the temperature control device 1.

(Temperature Control Method by Temperature Control Device 1)

FIG. 6 is a block diagram for describing a method of temperature control by the temperature control device 1.

The temperature control device 1 includes, for example, a temperature changeable section TV, an interface section IF, a sensor group Sg, a memory section Me, and a controller Cr.

The temperature changeable section TV includes the Peltier element 11 and the like. The temperature of the temperature changeable section TV is adjusted in accordance with a signal from the controller Cr.

The interface section IF includes, for example, a button and the like and a user is able to set temperature via the interface section IF. For example, the interface section IF allows a user to set temperature with five warming levels and five cooling levels. This temperature set by a user is inputted to the controller Cr. In addition, a user may be able to select an operation mode of the temperature control device 1 via the interface section IF. An operation mode of the temperature control device 1 is selectable, for example, from a standard mode, a skin esthetic mode, a running mode, and the like. The standard mode is for performing temperature control to allow a user to spend a comfortable time in typical living environments such as going to work and going to school. The skin esthetic mode aims to improve a skin condition. In the skin esthetic mode, warming and cooling are automatically repeated for a certain time. For example, it is then possible to confirm improvement in the skin condition by measuring the humidity of the skin with the sensor group Sg (body surface sensor 10S) and recording this data. In the running mode, the temperature control threshold of the standard mode is adapted to a running state. These operation modes are examples and a user may be able to select another operation mode.

The sensor group Sg includes, for example, an acceleration sensor SA (fourth sensor) and a gas sensor SG in addition to the Peltier element sensor 11S, the heat dissipation member sensor 12S, the body surface sensor 10S, and the environment sensor 21S. The acceleration sensor SA is for measuring a change (acceleration) in the moving velocity of the temperature control device 1. The measurement value of the acceleration sensor SA makes it possible to predict, for example, the action state of a user such as a walking state. The gas sensor SG is for measuring, for example, the concentrations of volatile organic compounds (VOCs: Volatile Organic Compounds), PM2.5, carbon dioxide ($CO_2$), and the like in the outside air. The gas sensor SG may also be for measuring a body odor component or the like on the body surface of a user. Signals corresponding to the measurement values of the respective sensors of this sensor group Sg are inputted to the controller Cr.

The memory section Me includes, for example, an NAND flash memory, an NOR flash memory, or the like. This memory section Me records the histories (logs) of data inputted to the controller Cr from the temperature changeable section TV, the interface section IF, and the sensor group Sg. In addition, the controller Cr is able to learn temperature control adapted to the physiological features, the lifestyle, and the like of each of users on the basis of these histories of data. In other words, the temperature control device 1 provided with the memory section Me makes it possible to perform temperature control that is more suitable to each of users.

The controller Cr includes, for example, the circuit board 15. This controller Cr drives the temperature changeable section TV and the fan 13 in accordance with set temperature inputted from the interface section IF and a signal inputted from the sensor group Sg. This causes temperature control to be performed on the temperature changeable section TV.

The temperature control device 1 may be able to transmit and receive data, for example, to and from the wearable device 50 different from the temperature control device 1 via the wireless communication section 15B (FIG. 3). The wearable device 50 includes, for example, a smartphone, a smart watch, and the like. For example, a user may set temperature from the wearable device 50 and this set temperature may be inputted to the controller Cr of the temperature control device 1. A user may select an operation mode from the wearable device 50 and this operation mode may be inputted to the controller Cr of the temperature control device 1. In addition, real-time data inputted to the controller Cr from the temperature changeable section TV, the sensor group Sg, and the interface section IF and the histories thereof may be transmitted to the wearable device 50. The wearable device 50 may have a portion of the functions of the controller Cr. The wearable device 50 may analyze the history of data sent from the temperature control device 1 and propose a method of using the temperature control device 1, a mode of using the temperature control device 1, and the like that are suitable to each of users. The wearable device 50 may analyze the history of data sent from the temperature control device 1, learn temperature control that is suitable to each of users, and update the control algorithm of the temperature control device 1.

FIG. 7 illustrates an example of a display surface (display surface 50A) of the wearable device 50. The display surface 50A is provided, for example, with a current condition display section RL, a statistics display section SL, and a temperature setting display section TS. Real-time data measured by the sensor group Sg are displayed in the current condition display section RL. The histories of the data measured by the sensor group Sg are displayed in the statistics display section SL. Temperature set by a user is displayed in the temperature setting display section TS.

Each of FIGS. 8A to 8C illustrates specific examples of the current condition display section RL and the statistics display section SL. For example, as illustrated in FIG. 8A, temperature and humidity measured by the body surface sensor 10S and temperature and humidity measured by the environment sensor 21S may be displayed in the current condition display section RL and the statistics display section SL. As illustrated in FIG. 8B, for example, the level of the amount of perspiration estimated from humidity measured by the body surface sensor 10S may be displayed in the current condition display section RL and the statistics display section SL. It is possible to obtain the estimated amount of perspiration, for example, from the inclination of a change in humidity measured by the body surface sensor 10S. As illustrated in FIG. 8C, for example, the level of body odor components on the body surface of a user measured by the gas sensor GS may be displayed in the current condition display section RL and the statistics display section SL.

FIG. 9 is a flowchart for describing an example of a method of temperature control by the temperature control device 1. The following describes the method of temperature control by using, along with this flowchart, an example of a situation in which a user moves from a room having a temperature of 25° C. and a humidity of 50% to an outdoor place having a temperature of 32° C. and a humidity of 80%.

First, the controller Cr detects a trigger (step S1). For example, a change in a predetermined parameter causes this trigger to be detected. Examples of the change in a predetermined parameter include a change in temperature set by a user, a change in the temperature and the humidity of outside air measured by the environment sensor 21S, a change in the temperature and the humidity of the body surface measured by the body surface sensor 10S, a change in an action of a user measured by the acceleration sensor SA, or the like.

After a trigger is detected, the controller Cr determines whether or not a user is wearing the temperature control device 1 (step S2). For example, in a case where a user is not wearing the temperature control device 1, that is, for example, the user keeps the temperature control device 1 in the bag, the controller Cr refrains from driving the temperature changeable section TV. This saves power and allows the battery 14 to be used for a longer time.

For example, using the difference between temperature measured by the body surface sensor 10S and temperature measured by the environment sensor 21S and the difference between humidity measured by the body surface sensor 10S and humidity measured by the environment sensor 21S, the controller Cr determines whether or not a user is wearing the temperature control device 1.

FIG. 10 illustrates temporal changes of the body surface sensor 10S and the environment sensor 21S in a case where a user is wearing the temperature control device 1. In a case where a user is wearing the temperature control device 1, temperature measured by the body surface sensor 10S and temperature measured by the environment sensor 21S have a greater difference and humidity measured by the body surface sensor 10S and humidity measured by the environment sensor 21S have a greater difference. In contrast, in a case where a user is not wearing the temperature control device 1, temperature measured by the body surface sensor 10S and temperature measured by the environment sensor 21S have a smaller difference and humidity measured by the body surface sensor 10S and humidity measured by the environment sensor 21S have a smaller difference.

After the controller Cr determines that a user is wearing the temperature control device 1, the controller Cr determines whether or not it is necessary to perform temperature control on the temperature changeable section TV (step S3). For example, using temperature and humidity measured by the body surface sensor 10S and the environment sensor 21S, the controller Cr determines whether or not it is necessary to perform temperature control on the temperature changeable section TV. For example, using temperature and humidity measured by the body surface sensor 10S, the environment sensor 21S, and the like, the controller Cr estimates a user's amount of perspiration, comfortability or discomfort index in a garment, or the like.

FIG. 11 is an example of an index representing comfortability in a garment and FIG. 12 is an example of the relationship between a discomfort index and a bodily sensation. For example, in a case where the environment sensor 21S measures a temperature of about 34° C. and a humidity of about 80%, the controller Cr estimates that a user feels uncomfortable in the garment. In a case where the controller Cr estimates that it is uncomfortable or totally uncomfortable as the comfortability in the garment, the controller Cr determines that it is necessary to perform temperature control on the temperature changeable section TV. In a case where a user's amount of perspiration estimated from humidity measured by the body surface sensor 10S exceeds a threshold, the controller Cr may determine that it is necessary to perform temperature control on the temperature changeable section TV. In a case where a discomfort index of 60 or less or 75 or more is estimated from temperature and humidity measured by the environment sensor 21S, the controller Cr may determine that it is necessary to perform temperature control on the temperature changeable section TV. For example, in a case where T (° C.) represents temperature measured by the environment sensor 21S and H (%) represents humidity measured by the environment sensor 21S, it is possible to obtain a discomfort index S in accordance with the following expression (1).

$$S=0.81T+0.01H(0.99T-14.3)+46.3 \tag{1}$$

In a case where the controller Cr determines that it is unnecessary to perform temperature control on the temperature changeable section TV, the controller Cr refrains from driving the temperature changeable section TV.

In a case where the controller Cr determines that it is necessary to perform temperature control on the temperature changeable section TV, the controller Cr performs temperature control on the temperature changeable section TV (step S4). For example, the controller Cr has a setting table in which a predetermined parameter is associated with the temperature setting of the temperature changeable section TV. The controller Cr performs temperature control on the temperature changeable section TV on the basis of this setting table. Examples of the predetermined parameter include temperature setting inputted by a user, comfortability in the garment of a user, a user's amount of perspiration, a discomfort index, an action of a user, and the like. In other words, the controller Cr transmits a driving signal to the temperature changeable section TV on the basis of a signal inputted from the interface section IF or the wearable device 50 and a signal inputted from the sensor group Sg.

FIG. 13 illustrates an example of the relationship between a change in the temperature of outside air caused by the movement of a user and the temperature setting of the Peltier element 11 (temperature changeable section TV). In a case where a user is wearing the temperature control device 1 and goes to an outdoor place having a temperature of 32° C. from a room having a temperature of 25° C., the controller Cr transmits a driving signal to the Peltier element 11. This driving signal causes a predetermined amount of currents to flow in the Peltier element 11, lowering the temperature of the Peltier element 11. The controller Cr transmits such a driving signal to the Peltier element 11 and drives the fan 13. For example, in a case where a user uses the interface section IF or the wearable device 50 to set temperature for the third cooling level, the controller Cr adjusts the temperature of the Peltier element 11 at 20° C. In a case where a user uses the interface section IF or the wearable device 50 to set temperature for the second cooling level, the controller Cr adjusts the temperature of the Peltier element 11 at 23° C.

The Peltier element sensor 11S and the heat dissipation member sensor 12S measure the temperature of the Peltier element 11 and the temperature of the heat dissipation member 12 and input signals corresponding to these measurement values to the controller Cr. The controller Cr uses these signals inputted from the Peltier element sensor 11S and the heat dissipation member sensor 12S to determine whether the temperature of the Peltier element 11 reaches desired temperature (e.g., 20° C. or 23° C. in FIG. 13). In a case where the temperature of the Peltier element 11 does not reach the desired temperature, the controller Cr adjusts the amount of currents flowing in the Peltier element 11.

While the controller Cr determines that it is necessary to perform temperature control on the temperature changeable section TV (e.g., while a user is in an outdoor place having an air temperature of 32° C. in FIG. 13), the controller Cr may change the amount of currents for driving the Peltier element 11. For example, the controller Cr increases the amount of currents for driving the Peltier element 11 and then decreases the amount of currents for driving the Peltier element 11. This change may be repeated. This brings about a temperature fluctuation effect and allows a user to feel more comfortable. In addition, it is also possible to suppress the amount of power to be consumed by the temperature control device 1.

In a case where a user uses the interface section IF or the wearable device 50 to change temperature setting, the controller Cr corrects a determination threshold and the above-described setting table (step S6). For example, in a case where a user changes temperature setting from the third cooling level to the fifth cooling level, the controller Cr eases the determination threshold as to whether or not temperature control is necessary (step S3) and makes an offset adjustment for the setting table to lower the set temperature of the Peltier element 11.

The temperature control device 1 performs temperature control, for example, as described above.

FIG. 14 illustrates an example of the communication state of the temperature control device 1. The temperature control device 1 may be able to transmit and receive signals, for example, to and from a server 60. For example, the temperature control device 1 transmits and receives data to and from the wearable device 50 via the wireless communication section 15B. Data are transmitted and received between this wearable device 50 and the server 60 via the Internet. For example, the histories of data inputted to the controller Cr from the temperature changeable section TV, the sensor group Sg, and the interface section IF are transmitted to the server 60 from the temperature control device 1 via the wearable device 50. These histories of data are stored and managed, for example, in the server 60 in association with each of accounts. The server 60 may analyze this history of data and propose a method of using the temperature control device 1, a mode of using the temperature control device 1, and the like that are suitable to each of users. Alternatively, the server 60 may analyze the histories of data sent from the plurality of wearable devices 50 from a variety of viewpoints, for example, the sex, age, residence, and the like of a user and propose a method of using the temperature control device 1, a mode of using the temperature control device 1, and the like that are suitable to each of the users. The server 60 may analyze the history of data sent from the temperature control device 1 or the wearable device 50, learn temperature control that is suitable to each of users, and update the control algorithm of the temperature control device 1.

(Method of Using Temperature Control Device 1)

A user uses the interface section IF of the temperature control device 1 or the wearable device 50 to select temperature setting (e.g., five cooling levels and five warming levels) in advance. The user puts the temperature control device 1, for example, in a pocket of the garment. The temperature control device 1 has been powered on.

Each of FIGS. 15A and 15B schematically illustrates a configuration of an undershirt (undershirt 70) provided with a pocket (pocket 70P) in which the temperature control device 1 is put. FIG. 15A illustrates the chest side of the undershirt 70 and FIG. 15B illustrates the back side of the undershirt 70. It is preferable that this undershirt 70 be made by using a material that increases the effects of the temperature control device 1. The undershirt 70 includes, for example, polyester or the like and has high air permeability or high airtightness. The undershirt 70 includes the pocket 70P at a position at which the pocket 70P is disposed near a cervical vertebra in a case where the user wears the undershirt 70. In other words, the undershirt 70 is provided with the pocket 70P around the neckline. The pocket 70P may be provided on the contact surface side with the skin of a user (body surface side of the user) (FIG. 15A) or may be provided on the non-contact surface side with the skin of a user (opposite side to the body surface of the user) (FIG. 15B). The depth of the pocket 70P is substantially the same, for example, as the length of a long side of the temperature control device 1. The temperature control device 1 is put in the pocket 70P.

It is preferable that there be provided a vent near the pocket 70P to efficiently take in outside air from the inlet ports 20I (FIG. 2) and efficiently discharge outside air from the exhaust port 20E (FIG. 4). The temperature control device 1 is put in the pocket 70P. The texture near the pocket 70P is rougher, for example, than the other portions of the undershirt 70. In addition, the pocket 70P may has a hole (e.g., hole 70A in FIGS. 16A and 16B described below) on the body surface side. The temperature control device 1 comes into direct contact with the skin of a user via this hole. This facilitates the user to sense the cooling effect or the warming effect of the temperature control device 1. This allows the user to feel more comfortable.

For example, in a case where a user walks to an outdoor place having a temperature of 32° C. and a humidity of 80% from a room having a temperature of 25° C. and a humidity of 50%, the controller Cr of the temperature control device 1 determines that it is necessary to perform temperature control on the temperature changeable section TV (step S3 in FIG. 9) and instructs the temperature changeable section TV (Peltier element 11) to make a temperature adjustment for 20° C. (see FIG. 13). This drives the Peltier element 11 and the fan 13. In other words, the temperature control device 1 is cooled to 20° C. and the cooled temperature control device 1 comes into contact with the skin near the cervical vertebra of the user.

FIG. 16 schematically illustrates that the temperature control device 1 cools (20° C.) a body B of a user or warms (e.g., 45° C. to 50° C.) the body B of the user and the temperature control device 1 sends wind A. The body B refers to, for example, the area near the cervical vertebra. For example, the temperature control device 1 put in the pocket 70P of the undershirt 70 dedicated to the temperature control device 1 makes it possible to easily cool or warm the body B of a user near the backbone. For example, the bottom 1G is then disposed on the bottom side of the pocket 70P. The temperature control device 1 subjected to temperature control comes into contact with the skin (body B) near the backbone of the user via the hole 70A provided to the pocket 70P on the body B side. In other words, the temperature control device 1 includes a contact portion C that comes into contact with the body B. This contact portion C of the temperature control device 1 cools or warms the body B of the user.

For example, a user is directly cooled near the cervical vertebra by the temperature control device 1. This suppresses rapid vasodilation and a sudden drop in blood pressure even in a high-temperature environment. It is thus possible to suppress sweat blowing out from the body B and suppress an increase in the temperature of the head. This allows the user to spend a comfortable time even in a high-temperature environment.

In addition, a capillary action caused by the fiber structure of the undershirt 70 makes sweat from the body B of a user finer. This finer sweat is effectively transpired by the wind A sent from the temperature control device 1. This makes it difficult for sweat to stay between the body B and a shirt 71, allowing the user to feel more comfortable.

For example, a user is directly warmed near the cervical vertebra by the temperature control device 1. This allows the user to spend a comfortable time even in a low-temperature environment.

In a case where the temperature control device 1 cools or warms a user in this way, the Peltier element 11 may change, for example, the amount of driving currents and cause the user to have a temperature fluctuation effect. This allows the user to feel still more comfortable. The histories of data of the sensor group Sg and the interface section IF are stored in the memory section Me, the wearable device 50, or the server 60. These histories of data allow the temperature control device 1 to learn the physiological characteristics and the like of a user and execute and propose a method of using the temperature control device 1 and the like that are suitable to each of users.

For example, in a case where a user walks to a train having a temperature of 25° C. and a humidity of 50% from an outdoor place having a temperature of 32° C. and a humidity of 80%, the controller Cr of the temperature control device 1 determines that it is unnecessary to perform temperature control on the temperature changeable section TV (step S3 in FIG. 9) and turns off the temperature changeable section TV (Peltier element 11)). In this way, the controller Cr determines whether or not it is necessary to perform temperature control on the temperature changeable section TV and automatically turns on or off the temperature changeable section TV. This saves power.

FIG. 17 illustrates another example of a method of using the temperature control device 1 illustrated in FIG. 16. In this way, the flat face 1F of the temperature control device 1 may be disposed on the bottom side of the pocket 70P.

(Workings and Effects)

In the temperature control device 1 according to the present embodiment, temperature and humidity measured by the environment sensor 21S, the body surface sensor 10S, and the like are inputted to the controller Cr. Temperature control is thus performed on the Peltier element 11 in accordance with the temperature and the humidity measured by the environment sensor 21S, the body surface sensor 10S, and the like. This makes it possible to perform temperature control that is more suitable to the situation.

For example, functional clothing with enhanced functions such as a heat retaining property or air permeability has been under development. The functional clothing does not, however, allow for temperature control that is suitable to the situation.

In addition, operators in factories, workers in outdoor constructions, and the like sometimes use air-conditioned clothing. This air-conditioned clothing has been, however, developed for use in operations in factories, outdoor constructions, and the like. It is thus difficult to treat the air-conditioned clothing in daily life.

In contrast, the temperature control device 1 includes the environment sensor 21S, the body surface sensor 10S, and the like. This makes it possible to control the temperature of the Peltier element 11 in accordance with temperature, humidity, and the like measured by these sensor groups Sg. Specifically, the controller Cr determines, for example, whether the situation has to be subjected to temperature control for a user or what temperature setting is suitable. This makes it possible to perform temperature control that is more suitable to the situation of a user.

Especially perspiration, thermal sensation, and the like are based on human physiological characteristics and are greatly different between respective users. The memory section Me, the wearable device 50, the server 60, or the like learns data of the interface section IF, the sensor group Sg, and the like and the method of temperature control is corrected in accordance with a result of this. This allows the temperature control device 1 to perform temperature control that is suitable to each of users.

In addition, measurement values measured by the sensor group Sg allow the controller Cr to estimate the situation in which each of users is placed. This allows the temperature control device 1 to switch, for example, a method of temperature control for going to work, a method of temperature control for fever, a method of temperature control for preventing heat stroke, and the like. The wearable device 50, the server 60, or the like may propose a method (e.g., a part of the body to be cooled, or the like) of using the temperature control device 1 to a user in accordance with the situation.

Further, it is possible to put the temperature control device 1, for example, in the pocket 70P (see FIGS. 15A and 15B) and the like of the undershirt 70. This allows each of users of all ages to easily wear the temperature control device 1. In other words, a user is able to easily use the temperature control device 1 in daily life such as going to work.

As described above, in the present embodiment, temperature, humidity, and the like measured by the environment sensor 21S, the body surface sensor 10S, and the like are inputted to the controller Cr. This makes it possible to perform temperature control that is more suitable to the situation. This allows the user to feel still more comfortable.

In addition, the temperature control device 1 is substantially as large as a card case, for example. It is possible to put the temperature control device 1 in the pocket 70P of the undershirt 70. This allows a user to fashionably wear the temperature control device 1.

Modification Example 1

FIG. 2 described above illustrates an example of the front-1A-side configuration of the temperature control device 1 and FIG. 3 described above illustrates an example of the back-1E-side configuration of the temperature control device 1. The temperature control device 1 is not, however, limited to these configurations.

Each of FIGS. 18A and 18B illustrates another example of a configuration of the temperature control device 1. FIG. 18A illustrates a back-1E-side configuration of the temperature control device 1 and FIG. 18B illustrates a front-1A-side configuration of the temperature control device 1. In a case where parts such as the battery 14 are, for example, made smaller in this way, it is also possible to eliminate another part provided to the fan 13 on the back 1E side. Securing the fan 13 a gap on the back 1E side in this way makes it possible to increase the intake efficiency.

Modification Example 2

FIG. 15A described above illustrates the pocket 70P having the depth that is substantially the same as the length of a long side of the temperature control device 1, but the pocket 70P is not limited to this shape.

Each of FIGS. 19A and 19B illustrates the pocket (pocket 70PH) having another shape. FIG. 19A illustrates the chest side of the undershirt 70 and FIG. 19B illustrates the back side of the undershirt 70. This pocket 70PH is provided, for example, a contact surface side with the skin of a user. The depth of the pocket 70PH is, for example, substantially half as long as a long side of the temperature control device 1. A portion of the temperature control device 1 is exposed from the pocket 70PH. For example, this undershirt 70 is provided with a hole (hole 70AH) on the back side. This hole 70AH is for increasing the intake efficiency of the temperature control device 1. The hole 70AH is disposed at a position corresponding to a portion of the pocket 70PH.

FIG. 20 schematically illustrates that the temperature control device 1 is kept in the pocket 70PH of this undershirt 70. For example, the flat face 1F is then disposed on the bottom side of the pocket 70P. The hole 70AH of the undershirt 70 is disposed at a position opposed to the inlet ports 20I provided to the recessed section 20R of the housing 20. There is provided, for example, a silicon sheet 81 between a portion of the temperature control device 1 exposed from the pocket 70PH and the body B. The silicon sheet 81 brings the temperature control device 1 into close contact with the body B. Here, the portion of the temperature control device 1 exposed from the pocket 70PH comes into close contact with the body B. This eliminates the necessity of the hole (hole 70A) for forming the contact portion (contact portion C) between the temperature control device 1 and the body B. This makes it possible to suppress the cost of the undershirt 70.

It is preferable to put the temperature control device 1 in the pocket 70PH with the flat face 1F disposed on the bottom side. Accordingly, the Peltier element 11 is provided closer to the cervical vertebra of a user than the Peltier element 11 with the bottom 1G disposed on the bottom side of the pocket 70PH (see FIG. 16). The user thus senses cooler. In addition, it is possible to more effectively suppress sweat blowing from the body B.

In addition, the hole 70AH provided to the undershirt 70 makes it possible to increase the efficiency of intake from the inlet ports 20I. This makes it possible to efficiently generate the upward (direction from the back to the cervical vertebra) wind A.

Modification Example 3

FIG. 7 described above illustrates an example in which the display surface 50A of the temperature control device 1 displays the current condition display section RL, the statistics display section SL, and the temperature setting display section TS, but the contents displayed in the display surface 50A, the designs thereof and like are not limited thereto.

FIG. 21 illustrates another example of the display surface 50A. This display surface 50A displays, for example, the current condition display section RL, a mode selection section MS, and the temperature setting display section TS. In other words, the mode selection section MS provided to the display surface 50A makes it possible to select an operation mode of the temperature control device 1.

For example, the mode selection section MS is provided with an AUTO button, an air flow rate button, and a MY button. The AUTO button is switched ON/OFF, for example, by a toggle. For example, in a case where the AUTO button is turned ON, the above-described standard mode is selected. In other words, the temperature of the Peltier element 11 is automatically adjusted by turning ON the AUTO button to allow a user to feel comfortable in a typical living environment such as going to work and going to school.

FIG. 22 illustrates the display surface 50A that is displayed after the air flow rate button is selected. For example, the selection of the air flow rate button makes it possible to select the strength of the wind A (see FIG. 16 or the like) sent from the temperature control device 1. For example, the strength of the wind A is selectable from three levels: a standard level; a medium level and a medium level; and a high level. The standard level is the default setting strength. For example, the wind A stronger than at the standard level is generated at the medium level. The wind A further stronger than at the medium level is generated at the high level. For example, it is also possible to set the strength of the wind A in selecting the standard mode. A user sets the strength of the wind A in accordance with his or her preference, thereby allowing the user to feel more comfortable. In addition, after the strength of the wind A is set in accordance with a user's preference, the user may use the temperature control device 1 as a handy fan.

FIG. 23 illustrates the display surface 50A that is displayed after the MY button is selected. For example, the selection of the MY button allows a user to set temperature and set time intervals. For example, after a user sets two temperature values for relatively high temperature and relatively low temperature, the user sets a time for keeping on each of the two temperature values. This causes the temperature control device 1 to repeat warming and cooling at certain time intervals. Such setting of the MY button may be used, for example, as one of beauty treatments that alternately repeats warming skin care and cooling skin care. Alternatively, after only one of the relatively high temperature or the relatively low temperature is set, a time may be set for keeping on this temperature. For example, the temperature control device 1 may be used to wake up a user by repeating cooling and stopping cooling (normal temperature) at certain intervals. Alternatively, after a user sets two temperature values for relatively low temperature and still lower temperature, the user sets a time for keeping on each of the two temperature values. This causes the temperature control device 1 to repeat cooling at certain high and low levels. Such setting of the MY button may be used, for example, one of simple icing methods.

For example, a setting screen of the MY button is easily switchable to an SNS (Social Networking Service) screen. A user is able to set the MY button by copying the setting of another user shared in the SNS. Alternatively, the setting screen of the MY button itself may be sharable in the SNS.

Other Modification Examples

In the above-described embodiment, an example has been described in which the temperature control device 1 is put in the pocket 70P of the undershirt 70. The temperature control device 1 may be, however, put in a pocket (e.g., pockets 72P and 73P in FIGS. 24A and 24B described below) of another garment. Alternatively, the temperature control device 1 may be attached to an attachment assist tool (strap 80 in FIG. 25 described below). Alternatively, the user may hold the temperature control device 1 in a hand and brings the temperature control device 1 into contact with a part of the body to be cooled or warmed.

FIGS. 24A and 24B illustrate examples of configurations of a T shirt 72 worn by a user over an undershirt and pants 73. The temperature control device 1 may be put in the pocket 72P, the pocket 73P, or the like. The pocket 72P is provided near the chest of this T shirt 72. The pocket 73P is provided near the waist of the pants 73. It is possible to put the temperature control device 1 in a pocket of any garment usually worn by a user.

FIG. 25 illustrates an example of a configuration of the strap 80 to which the temperature control device 1 is attached. This strap 80 is provided with an attachment section 80A at a portion that comes into contact with the neck of a user. The temperature control device 1 is attached to this attachment section 80A. In this way, the use of an attachment assist tool having a strap shape allows a user to be easily cooled or warmed near the cervical vertebra.

In the above-described embodiment, a case has been mainly described in which the temperature control device 1 is worn by a user near the cervical vertebra. It is, however, sufficient if a part of the body at which each of users wears the temperature control device 1 is selected in accordance with the user's physiological characteristics, purpose of use, and the like. For example, the selection of the place in which a pocket of clothes is disposed, the form of the attachment assist tool, and the like makes it possible to easily change a part of the body at which the temperature control device 1 is disposed.

The above has described the present technology with reference to the embodiment and the modification examples, but the present technology is not limited to the above-described embodiment and the like. It is possible to make various kinds of modifications thereof. For example, the components, the disposition, and the like of the temperature control device 1 exemplified in the above-described embodiment and the like are merely examples, but it is not necessary to include all of the components. In addition, other components may also be included.

In addition, in the above-described embodiment and the like, the Peltier element 11 is described as a specific example of the temperature changer according to the present technology, but the temperature changer may also include another component.

In addition, in the above-described embodiment and the like, an example has been described in which the temperature of the temperature control device 1 is automatically controlled in accordance with the situation and the like. The temperature control device 1 may, however, make a certain temperature adjustment corresponding to a setting value regardless of the situation.

In addition, in the above-described embodiment and the like, an example in which a person wears the temperature control device 1 has been described as an example in which the temperature control device 1 is used. The temperature control device 1 may, however, cool or warm, for example, an object such as drink. Alternatively, it is also possible to cool a smartphone or the like by the temperature control device 1.

It is to be noted that the effects described in this specification are mere examples, but not limited thereto. In addition, there may be other effects.

It is to be noted that the present technology may also be configured as follows. The temperature control device, the garment, and the attachment assist tool according to the present technology each having the following configurations each cause the controller to receive temperature measured by the first sensor. This makes it possible to perform temperature control that is more suitable to the situation. This allows the user to feel still more comfortable.

(1)
A temperature control device including:
 a first sensor that measures at least temperature;
 a controller to which the temperature measured by the first sensor is inputted;
 a temperature changer that is electrically coupled to the controller;
 a heat dissipation member that is provided on one of sides of the temperature changer; and
 a fan that ventilates an area around the heat dissipation member.

(2)
The temperature control device according to (1), further including a battery that supplies the controller, the temperature changer, and the fan with power supply voltages.

(3)
The temperature control device according to (1) or (2), in which the first sensor measures the temperature and humidity.

(4)
The temperature control device according to (3), in which the first sensor measures the temperature and the humidity near a body surface of a user of the temperature control device.

(5)
The temperature control device according to (4), further including a second sensor that measures temperature and humidity in an environment in which the temperature control device is disposed.

(6)
The temperature control device according to (5), further including a third sensor that measures temperature of the temperature changer.

(7)
The temperature control device according to (6), in which the controller is configured to control the temperature of the temperature changer on the basis of at least a setting value of temperature, the temperature and the humidity measured by the first sensor, the temperature and the humidity measured by the second sensor, and temperature measured by the third sensor, the setting value being inputted in advance.

(8)
The temperature control device according to (7), further including a fourth sensor that measures acceleration of the temperature control device and inputs the measured acceleration to the controller, in which
 the controller is configured to control the temperature of the temperature changer further on the basis of the acceleration measured by the fourth sensor.

(9)
The temperature control device according to any one of (1) to (8), in which the temperature control device is configured to change an amount of currents that flow in the temperature changer while the temperature is controlled on the basis of a signal of the controller.

(10)
The temperature control device according to any one of (1) to (9), in which the controller is provided with a wireless communication section, the wireless communication section being configured to transmit and receive data to and from a wearable device.

(11)
The temperature control device according to any one of (1) to (10), in which the temperature changer includes a Peltier element.

(12)
The temperature control device according to any one of (1) to (11), in which the temperature control device has a curved side shape.

(13)
A garment including
 a pocket in which a temperature control device is put, in which
 the temperature control device includes
 a first sensor that measures at least temperature,
 a controller to which the temperature measured by the first sensor is inputted,
 a temperature changer that is electrically coupled to the controller,
 a heat dissipation member that is provided on one of sides of the temperature changer, and
 a fan that ventilates an area around the heat dissipation member.

(14)
The garment according to (13), in which the pocket is provided on a body surface side of a user.

(15)
The garment according to (13), in which the pocket is provided on a side opposite to a body surface of a user.

(16)
An attachment assist tool including
 an attachment section for a temperature control device, in which
 the temperature control device includes
 a first sensor that measures at least temperature,
 a controller to which the temperature measured by the first sensor is inputted,
 a temperature changer that is electrically coupled to the controller,
 a heat dissipation member that is provided on one of sides of the temperature changer, and
 a fan that ventilates an area around the heat dissipation member.

(17)

The attachment assist tool according to (16), in which the attachment assist tool has a strap shape.

It should be understood by those skilled in the art that various modifications, combinations, sub-combinations, and alterations may occur depending on design requirements and other factors insofar as they are within the scope of the appended claims or the equivalents thereof.

The invention claimed is:

1. An attachment assist tool comprising:
an attachment portion for a temperature control device,
wherein the temperature control device includes
a first sensor configured to measure temperature,
a controller to which the temperature measured by the first sensor is inputted,
a temperature changer that is electrically coupled to the controller,
a heat dissipation member that is provided on one side of the temperature changer,
a fan configured to ventilate an area around the heat dissipation member, and
a housing,
wherein the housing comprises a recessed section on a side where the fan is disposed and adjacent to the fan,
wherein the recessed section is provided with one or more inlet ports on a front side of the fan,
wherein the first sensor, the controller, the temperature changer, the heat dissipation member, and the fan are inside the housing, and
wherein the controller is implemented via at least one processor.

2. The attachment assist tool according to claim 1, wherein the attachment assist tool has a strap shape.

3. A garment comprising:
a pocket in which a temperature control device is provided,
wherein the temperature control device includes
a first sensor configured to measure temperature,
a controller to which the temperature measured by the first sensor is inputted,
a temperature changer that is electrically coupled to the controller,
a heat dissipation member that is provided on one side of the temperature changer,
a fan configured to ventilate an area around the heat dissipation member, and
a housing,
wherein the housing comprises a recessed section on a side where the fan is disposed and adjacent to the fan,
wherein the recessed section is provided with one or more inlet ports on a front side of the fan,
wherein the first sensor, the controller, the temperature changer, the heat dissipation member, and the fan are inside the housing, and
wherein the controller is implemented via at least one processor.

4. The garment according to claim 3,
wherein the pocket is provided on a body surface side of a user.

5. The garment according to claim 3,
wherein the pocket is provided on a side opposite to a body surface of a user.

6. A temperature control device comprising:
a first sensor configured to measure temperature;
a controller to which the temperature measured by the first sensor is inputted;
a temperature changer that is electrically coupled to the controller;
a heat dissipation member that is provided on one side of the temperature changer;
a fan configured to ventilate an area around the heat dissipation member; and
a housing,
wherein the housing comprises a recessed section on a side where the fan is disposed and adjacent to the fan,
wherein the recessed section is provided with one or more inlet ports on a front side of the fan,
wherein the first sensor, the controller, the temperature changer, the heat dissipation member, and the fan are inside the housing, and
wherein the controller is implemented via at least one processor.

7. The temperature control device according to claim 6, further comprising:
a battery configured to supply power supply voltages to the controller, the temperature changer, and the fan.

8. The temperature control device according to claim 6,
wherein the temperature control device is configured to change an amount of currents that flow in the temperature changer while the temperature is controlled on a basis of a signal of the controller.

9. The temperature control device according to claim 6,
wherein the controller is provided with a wireless communication section,
wherein the wireless communication section is configured to transmit and receive data to and from a wearable device, and
wherein the wireless communication section is implemented via at least one processor.

10. The temperature control device according to claim 6, wherein the housing has a curved side shape.

11. The temperature control device according to claim 6,
wherein the fan is configured to take in outside air from the one or more inlet ports and send the air to the heat dissipation member.

12. The temperature control device according to claim 6,
wherein the temperature changer includes a Peltier element.

13. The temperature control device according to claim 6,
wherein the controller is configured to perform temperature control using at least one of the temperature changer or the fan according to a selected operation mode.

14. The temperature control device according to claim 6,
wherein the first sensor is further configured to measure humidity.

15. The temperature control device according to claim 14,
wherein the first sensor measures the temperature and the humidity near a body surface of a user of the temperature control device.

16. The temperature control device according to claim 15, further comprising:
a second sensor configured to measure temperature and humidity in an environment in which the temperature control device is disposed.

17. The temperature control device according to claim 16, further comprising:
a third sensor configured to measure temperature of the temperature changer.

18. The temperature control device according to claim 17,
wherein the controller is configured to control the temperature of the temperature changer on a basis of at least a setting value of temperature, the temperature and the humidity measured by the first sensor, the temperature and the humidity measured by the second sensor, and temperature measured by the third sensor, the setting value being inputted in advance.

19. The temperature control device according to claim 18, further comprising:
a fourth sensor configured to
measure acceleration of the temperature control device, and
input the measured acceleration to the controller,
wherein the controller is configured to control the temperature of the temperature changer further on a basis of the acceleration measured by the fourth sensor.

* * * * *